US010921275B2

(12) United States Patent
Kersey

(10) Patent No.: US 10,921,275 B2
(45) Date of Patent: Feb. 16, 2021

(54) TOMOGRAPHIC DETERMINATION OF MULTIPHASE FLOWS IN PIPES AND/OR LIQUID/FROTH INTERFACES IN PROCESS TANKS USING HIGH SPEED MULTIPLEXED ELECTRICAL IMPEDANCE SENSING

(71) Applicant: CiDRA Corporate Services Inc., Wallingford, CT (US)

(72) Inventor: Alan D. Kersey, South Glastonbury, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 363 days.

(21) Appl. No.: 14/762,215

(22) PCT Filed: Jan. 22, 2014

(86) PCT No.: PCT/US2014/012506
§ 371 (c)(1),
(2) Date: Jul. 21, 2015

(87) PCT Pub. No.: WO2014/116673
PCT Pub. Date: Jul. 31, 2014

(65) Prior Publication Data
US 2015/0346129 A1 Dec. 3, 2015

Related U.S. Application Data

(60) Provisional application No. 61/755,292, filed on Jan. 22, 2013.

(51) Int. Cl.
*G01N 27/08* (2006.01)
*G01N 27/22* (2006.01)
(Continued)

(52) U.S. Cl.
CPC ............ *G01N 27/08* (2013.01); *G01B 15/00* (2013.01); *G01B 15/06* (2013.01); *G01N 27/226* (2013.01)

(58) Field of Classification Search
CPC ...... G01N 27/08; G01N 27/226; G01B 15/00; G01B 15/06
See application file for complete search history.

(56) References Cited

U.S. PATENT DOCUMENTS 4,328,707 A 5/1982 Clement et al.
4,386,854 A 6/1983 Byer
(Continued)

*Primary Examiner* — Akm Zakaria
(74) *Attorney, Agent, or Firm* — Ware, Fressola, Maguire & Barber LLP

(57) ABSTRACT

Apparatus is provided featuring a signal processor or processing module configured at least to: receive signaling containing information about coded and multiplexed voltages measured across pairs of electrodes in an array of electrodes configured in relation to a fluid processing structure, including a pipe, tank, vessel, vat or container, having a process fluid therein; and determine using a tomographic signal processing algorithm a tomographic indication of the process fluid, based at least partly on the signaling received. The signal processor module may be configured to provide corresponding signaling containing information about the tomographic indication of the process fluid. The tomographic indication includes a 2D or 3D image or visualization of the process fluid, including an analysis of mixing in multiphase flows, liquid interfaces or liquid-froth layers detected in the process fluid.

19 Claims, 5 Drawing Sheets

Multiplexed Electrical Impedance Tomography System

(51) Int. Cl.
*G01B 15/06* (2006.01)
*G01B 15/00* (2006.01)

(56) References Cited

U.S. PATENT DOCUMENTS

| | | | |
|---|---|---|---|
| 5,181,778 A | | 1/1993 | Beller |
| 5,359,627 A | * | 10/1994 | Resnikoff ............... H04L 23/02 370/200 |
| 6,078,397 A | | 6/2000 | Monchalin et al. |
| 2005/0093548 A1 | * | 5/2005 | Ueda ........................ G01V 3/06 324/357 |
| 2006/0050352 A1 | * | 3/2006 | Schwarte ............. H03D 9/0608 359/237 |
| 2007/0133746 A1 | | 6/2007 | Ortiz Aleman et al. |
| 2010/0303321 A1 | * | 12/2010 | McEwan .............. A61B 5/0536 382/131 |
| 2012/0038368 A1 | | 2/2012 | Mahalingam et al. |
| 2012/0098549 A1 | * | 4/2012 | Wang ................... G01N 27/026 324/649 |
| 2012/0288044 A1 | * | 11/2012 | Roberts ..................... H03L 7/00 375/350 |
| 2016/0011136 A1 | * | 1/2016 | Schleicher ......... G01N 33/2823 324/663 |

* cited by examiner

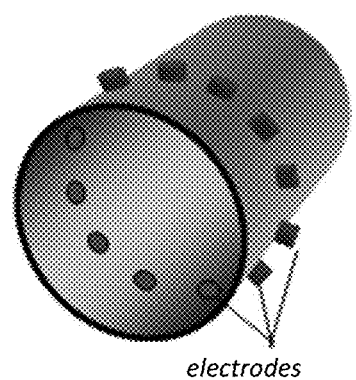
Figure 1 (Prior Art): Basic configuration of using an array of electrodes around a pipe to perform EIT or ECT based tomographic imaging

Apparatus 10

Signal processor or signal processing module 10a configured at least to receive signaling $S_{in}$ containing information about coded and multiplexed voltages measured across pairs of electrodes in an array of electrodes configured in relation to a fluid processing structure, including a pipe, tank, vessel or container, having a process fluid therein; and determine using a tomographic signal processing algorithm a tomographic indication containing information about the process fluid, based at least partly on the signaling $S_{in}$ received; and/or provide corresponding signaling $S_{out}$ containing information about the tomographic indication determined.

One or more other module/components 10b, including input/output components/modules, memory (RAM, ROM, EPROM, etc.), data, control and address busing architecture, etc.

Figure 2a

Figure 3: Principle of Operation of the Code Multiplexed EIT concept.
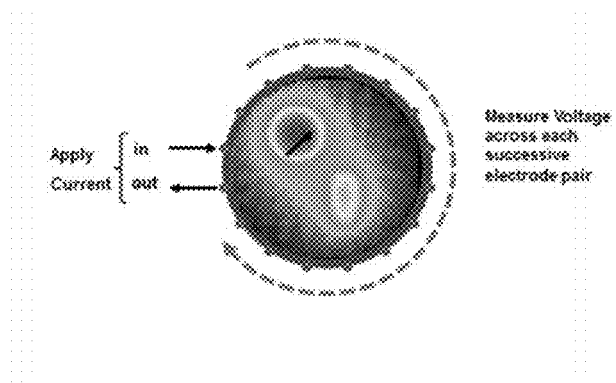
Fig. 3a (Prior art): Serial Detection (non-multiplexed) Electrical Impedance Tomography System
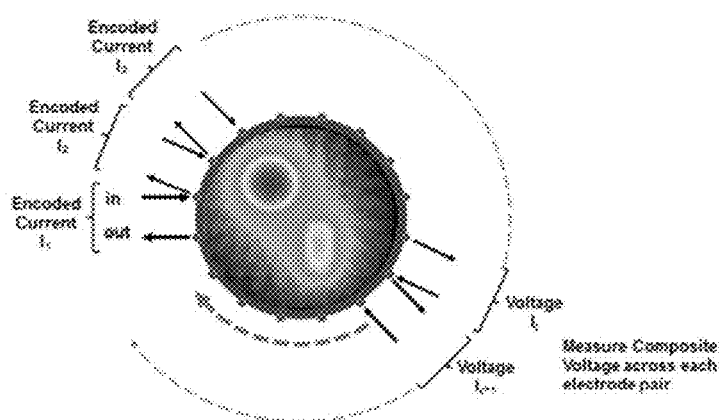
Fig. 3b: Multiplexed Electrical Impedance Tomography System

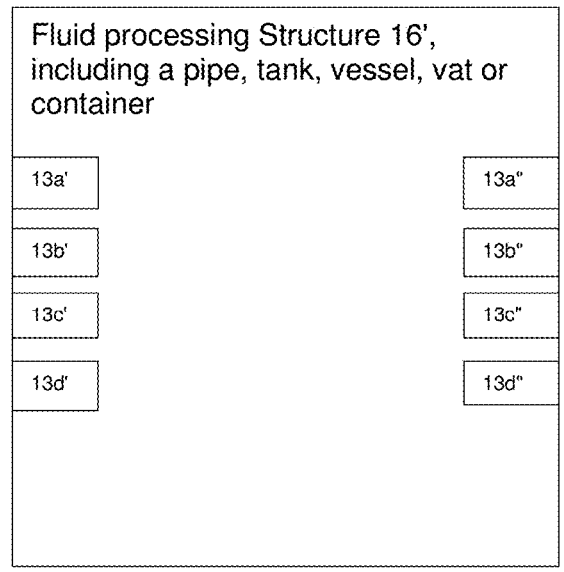
Figure 3c
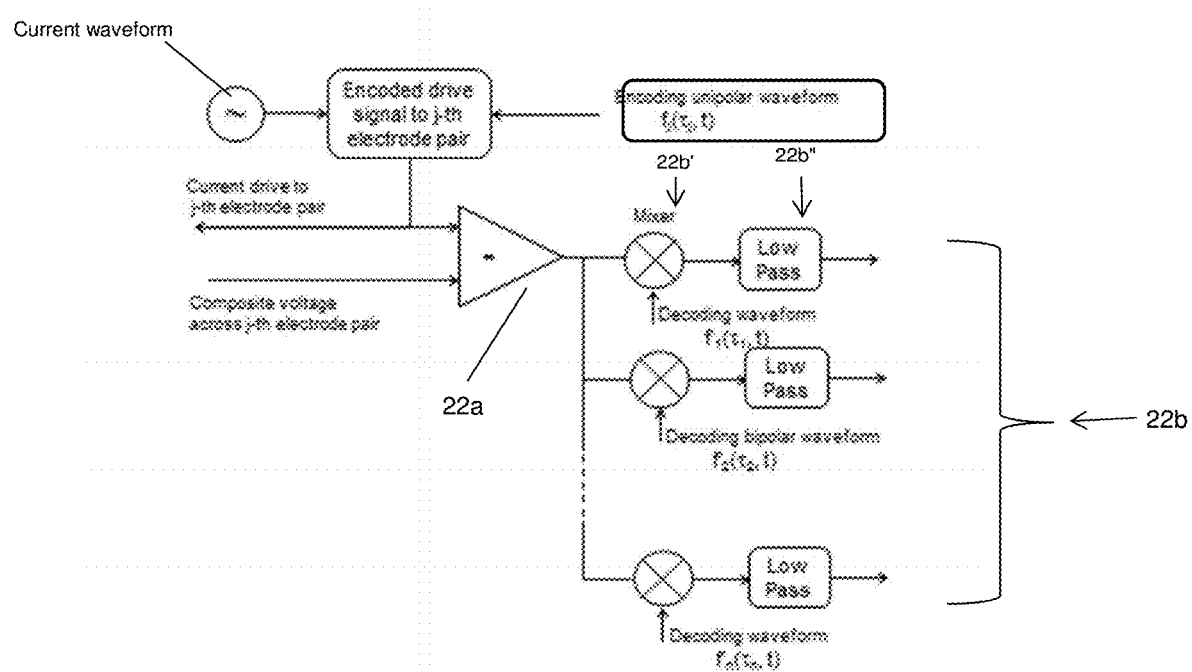
Figure 4: Demultiplexing structure for CMEIT

TOMOGRAPHIC DETERMINATION OF MULTIPHASE FLOWS IN PIPES AND/OR LIQUID/FROTH INTERFACES IN PROCESS TANKS USING HIGH SPEED MULTIPLEXED ELECTRICAL IMPEDANCE SENSING

CROSS-REFERENCE TO RELATED APPLICATIONS

This application corresponds to international patent application serial no. PCT/US2014/012506, filed 22 Jan. 2014, which claims benefit to provisional patent application Ser. No. 61/755,292 (CCS-0108), filed 22 Jan. 2013, which is incorporated by reference in their entirety.

BACKGROUND OF THE INVENTION

1. Field of Invention

The present invention relates to a technique for processing a fluid in a processing structure, such as a pipe, tank, vessel, vat or container; and more particular to a technique for processing a fluid in such a processing structure using a tomographic processing technique.

2. Description of Related Art

Tomographic approaches based on the use of Electrical Resistance Tomography (ERT), Electrical Capacitance Tomography (ECT) and Electrical Impedance Tomography (EIT) are becoming widely exploited in industrial processes in, for example, the analysis of mixing in multi-phase flows, liquid interfaces and detecting liquid-froth layers.

These approaches are based on the difference in conductivity or electrical (complex) permittivity of the materials under investigation. FIG. 1 illustrates a typical configuration for tomographic analysis of the fluids inside a pipe.

In the case of electrical resistivity tomography, fluids of varying electrical conductivity flowing in a pipe can be 'visualized' by injecting typically an AC current (at a few kHz to say 20 kHz) between a pair of electrodes and measuring the potential difference between the other pairs of electrodes around the pipe. Synchronous (phase sensitive) detection is used to eliminate LF drift electrical signals, etc. The injection pair is then changed to the next pair of electrodes and the potential differences at the other electrode pairs are again monitored.

Once all the pairs of electrodes have been tested the collected information can be used to perform a back projection to visualize the constituents (in terms of electrical properties) of the fluid flowing. This 'snapshot' is commonly referred to as a frame, in a similar vein to video processing. There are a number of algorithms for performing this back projection, some based on deterministic algorithms, others based on statistical (probability) algorithms. As this overall measurement process is a serial process, consistent with that shown in FIG. 3*a*, it is time consuming and can limit the rate at which a full tomographic image/frame is generated. For example, for 16 electrodes, a basic frame required 16×15 measurements or 240 electrical measurements of potential. If these measurements exceed 30 millisecond in duration, frame rates of higher than 30 frames/sec cannot be achieved. If the electrodes could be monitored simultaneously, or partially in a simultaneously multiplexed mode, higher frames rates could be used, or longer measurement intervals could be achieved to give better S/N measurements.

SUMMARY OF THE INVENTION

According to some embodiments of the present invention, in order to speed this process, a multiplexed sensing approach may be employed to overcome the otherwise serial sensing approach described above in relation to the prior art. According to the present invention, an approach to performing multiplexed tomographic measurements based on a code-division multiplexing format may be used and is set forth herein.

In summary, and by way of example, in the operation of a Code Multiplexed EIT (CMEIT), current may be injected into several pairs of electrodes simultaneously; however, each current may be over modulated by a Pseudo-Random Noise Code, such as an M-sequence, or Gold-code. Synchronous detection of the codes at electrode receiver pairs can then be used to separate (decode) the signals associated with the different drive currents applied. M-sequence codes are attractive for this application due to their strong sequence orthogonality, which results in low cross talk between measurements.

Examples of Particular Embodiments

In particular, and according to some embodiments, the present invention may include, or take the form of, apparatus featuring a signal processor or processing module configured at least to:
  receive signaling containing information about coded and multiplexed voltages measured across pairs of electrodes in an array of electrodes configured in relation to a fluid processing structure, including a pipe, tank, vessel, vat or container, having a process fluid therein; and
  determine using a tomographic signal processing algorithm a tomographic indication containing information about the process fluid, based at least partly on the signaling received.

According to some embodiment of the present invention, the signal processor module may be configured to provide corresponding signaling containing information about the tomographic indication.

The present invention may also include one or more of the following features:

The tomographic indication may include, or take the form of, an image or visualization of the process fluid, including an analysis of mixing in multiphase flows, liquid interfaces or liquid-froth layers detected in the process fluid.

The signaling may include information about a respective measured composite voltage across each electrode pair.

The signaling may include coded and multiplexed voltage signaling synchronously detected in response to a simultaneous injection of encoded current signaling provided to the pairs of electrodes.

The simultaneous injection of the encoded current signaling may be based at least partly on using a code division multiplexing scheme.

The encoded current signaling may include each encoded current signal being over-modulated by a Pseudo-Random Noise Code, including an M-sequence or a Gold-code.

The apparatus may include a current signaling coding and multiplexing circuit configured to provide the encoded current signaling.

The current signaling coding and multiplexing circuit may be configured to code and multiplex the encoded current signaling, e.g., by:

applying a current signal $I_1$ driven and formed by an M-Sequence noise code to one pair of electrodes; and injecting simultaneously current signals $I_2$ to $I_n$ between n−1 other pairs of electrodes, and modulating each current signal $I_2$ to $I_n$ by the same M-sequence code as the current signal $I_1$, each current signal $I_2$ to $I_n$ being successively delayed by one clock period, T, of an M-sequence noise code bit rate.

The apparatus may include a voltage signaling decoding and demultiplexing circuit configured to receive voltage signaling measured across the pairs of electrodes in the array of electrodes and provide the signaling containing information about the coded and multiplexed voltages.

The voltage signaling decoding and demultiplexing circuit may be configured to use a synchronous detection of codes at electrode receiver pairs to separate or decode the voltage signaling associated with different drive current signaling applied.

The voltage signaling decoding and demultiplexing circuit may include a differencing circuit and a bank of demultiplexing circuits having mixer circuits and low pass filter circuits. The differencing circuit may be configured to subtract a drive voltage signal applied to a j-th electrode pair from a composite voltage signal across the j-th electrode pair, and provide a resulting waveform signal. The mixer circuits may be configured to mix the resulting waveform signal with a reference bipolar version (1, −1) of noise codes at each code delay used to drive injection current signals $I_1$-$I_n$, and provide mixed resulting waveform signals. The low pass filter circuits may be configured to filter the mixed resulting waveform signals and provide a final set of low pass filter output signals for each electrode pair, so that N−1 output signals are produced, and each output signal can be read simultaneously by a data acquisition system.

The array of electrodes may include, or may form part of, either a peripheral array of electrodes configured around the pipe, tank, vessel, vat or container, or a linear probe tomographic system having linear probes configured in or inside the fluid processing structure.

The pairs of electrodes in the array of electrodes may be based at least partly on using electrical resistance, capacitive or impedance configurations.

The tomographic signal processing algorithm may be based at least partly on an electrical-based tomographic signal processing algorithm, including electrical resistance tomography (ERT), electrical capacitive tomography (ECT), or electrical impedance tomography (EIT).

The signal processor or signal processing module may be configured with at least one processor and at least one memory including computer program code, the at least one memory and computer program code configured, with the at least one processor, to cause the apparatus at least to receive the signaling and determine using the tomographic signal processing algorithm the tomographic indication of the process fluid, based at least partly on the signaling received.

The Method

According to some embodiments, the present invention may include, or take the form of, a method or process that includes steps for receiving in a signal processor or signal processing module signaling containing information about coded and multiplexed voltages measured across pairs of electrodes in an array of electrodes configured in relation to a fluid processing structure, including a pipe, tank, vessel or container, having a process fluid therein; and determining in the signal processor or signal processing module using a tomographic signal processing algorithm a tomographic indication containing information about the process fluid, based at least partly on the signaling received.

The method may include providing with the signal processor or signal processing module corresponding signaling containing information about the tomographic indication determined; and/or may also include providing a simultaneous injection of encoded current signaling to the pairs of electrodes, and synchronously detecting coded and multiplexed voltage signaling in response thereto, as well as one or more of the features set forth herein, according to some embodiments of the present invention.

BRIEF DESCRIPTION OF THE DRAWING

The drawing includes FIGS. 1-4, which are not necessarily drawn to scale, as follows:

FIG. 1 shows a basic configuration of using an array of electrodes around a pipe to perform EIT or ECT based tomographic imaging that is known in the art.

FIG. 2a is a block diagram of apparatus in the form of a signal processor or processing module configured to implement some embodiments of the present invention.

FIG. 3 includes FIGS. 3a, 3b and 3c, where FIG. 3a shows a diagram of a serial detection (non-multiplexed) electrical impedance tomography system that is known in the art; where FIG. 3b shows a diagram of a multiplexed electrical impedance tomography system, according to some embodiments of the present invention; and where FIG. 3c shows a diagram of a processing structure, according to some embodiments of the present invention.

FIG. 4 is a diagram of a demultiplexing structure or circuit for CMEIT, according to some embodiments of the present invention.

DETAILED DESCRIPTION OF BEST MODE OF THE INVENTION

FIG. 2a: The Basic Apparatus 10

Figure 2B:
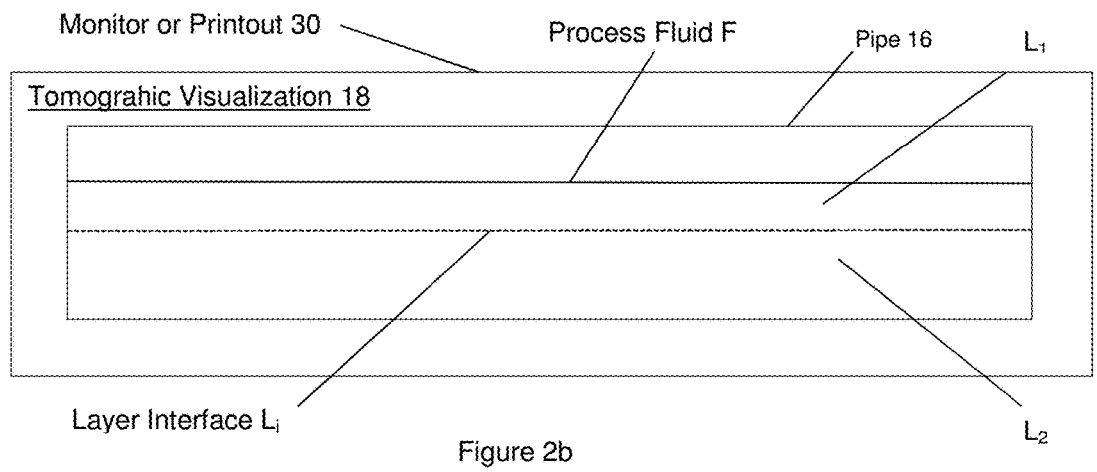
FIG. 2b shows an example of a tomographic indication containing information about the process fluid, according to some embodiments of the present invention.

FIG. 2a shows one embodiment of the present invention in the form of apparatus 10 configured with a signal processor or processing module 10a for implementing the basic signal processing functionality according to some embodiments of the present invention. The signal processor or processing module 10a may be configured at least to:

receive signaling $S_{in}$ containing information about coded and multiplexed voltages measured across pairs of electrodes 12a', 12a", 12b', 12b", 12c', 12c" and 12d', 12d" (FIG. 3b) in an array generally indicated as 14 (FIG. 2c) of such electrodes configured in relation to a fluid processing structure 16 (FIG. 2c), including a pipe, tank, vessel, vat or container, having a process fluid F (FIG. 2c) therein; and determine using a tomographic signal processing algorithm a tomographic indication 18 (e.g., an image or visualization (see FIG. 2b)) containing information about of the process fluid F, based at least partly on the signaling $S_{in}$ received.

By way of example, the tomographic indication 18 may take the form of a tomographic image or visualization that may include information, e.g., in the form of an analysis of mixing in multiphase flows, liquid interfaces or liquid-froth layers detected in the process fluid. The tomographic image or visualization of the process fluid F in the processing structure 16, e.g., may include a 2D or 3D image or visualization of the multiphase flows, or the liquid interfaces or the liquid-froth layers, e.g., in real time. The tomographic indication may also include information in the form of a numeric indicator(s) containing information about the process fluid F in the processing structure 16, e.g., including a numeric indicator characterizing the multiphase flows, or the liquid interfaces, or the liquid-froth layers, such as the number of liquid interfaces or liquid interfaces, or the depth or location of liquid interfaces or liquid interfaces, etc. Embodiments are also envisioned in which, and the scope of the invention is intended to include, the tomographic indication 18 taking the form of information contained in some kind of control signaling, e.g., that may be provided and used to modify the processing of the process fluid F in the processing structure 16, e.g., including to modify a characteristic of the multiphase flows, or the liquid interfaces, or the liquid-froth layers, etc., and e.g., also including providing a dosing of some chemical agent upstream or downstream in a pipe, or into a tank, vessel, vat or container holding the processing fluid F By way of example, the signaling $S_{in}$ may include information about include a respective measured composite voltage across each electrode pair. Moreover, the signaling $S_{in}$ may include coded and multiplexed voltage signaling $V_i$ (see FIG. 2c), synchronously detected in response to a simultaneous injection of encoded current signaling ($I_i$) in FIG. 2c, provided to the pairs of electrodes 12a', 12a'', 12b', 12b'', 12c', 12c'' and 12d', 12d''. The coded and multiplexed voltage signaling $V_i$ (see FIG. 2c), e.g., may correspond to voltages indicated as voltage $I_i$, voltage $I_{i+1}$, in FIG. 3b; while the encoded current signaling ($I_i$) in FIG. 2c, e.g., may correspond to currents indicated as $I_1$, $I_2$, $I_3$, in FIG. 3b. The simultaneous injection of the encoded current signaling ($I_i$) in FIG. 2c, or currents $I_1$, $I_2$, $I_3$ in FIG. 3b, may be based at least partly on, e.g., using a code division multiplexing scheme, although the scope of the invention is intended to include, and embodiments are envisioned in which, other types or kind of multiplexed coding scheme may be used, including those now known or later developed in the future.

The signal processor or processing module 10a may also be configured to provide corresponding signaling $S_{out}$ containing corresponding information about the tomographic indication 18 (FIG. 2b) of the process fluid F, e.g., including in the form of control signaling that may be provided and used to modify the processing of the process fluid F in the processing structure 16, e.g., including to modify a characteristic of the multiphase flows, or the liquid interfaces, or the liquid-froth layers, etc.

The scope of the invention is not intended to be limited to the type or kind of use of the corresponding signaling $S_{out}$ containing information about the tomographic visualization 18 of the process fluid F, including for further processing, printing or displaying, as well as for other types or kinds of uses either now known or later developed in the future.

Further, the scope of the invention is not intended to be limited to the type or kind of process fluid F contained, processed or flowing in the pipe, tank, cell or vessel. For example, the scope of the invention is intended to include processing fluids that are either now known or later developed in the future. Moreover, the scope of the invention is intended to include sensing and determining the analysis of mixing in the multiphase flows, the liquid interfaces or the liquid-froth layers detected in the process fluid in pipes, tanks, cells, vat, vessels or container, etc., using techniques that are either now known or later developed in the future. Moreover still, the scope of the invention is not intended to be limited to the type or kind of industrial process of which the process fluid F is being processed, including a process or processes that is or are either now known or later developed in the future.

The apparatus 10 may also include other circuits, components or modules 10b to implement the functionality of the signal processor or processing module 10a either now known or later developed in the future, e.g., including memory modules, input/output modules, data and busing architecture and other signal processing circuits, wiring or components, consistent with that known by a person skilled in the art, and/or consistent with that set forth herein.

Figure 2C:
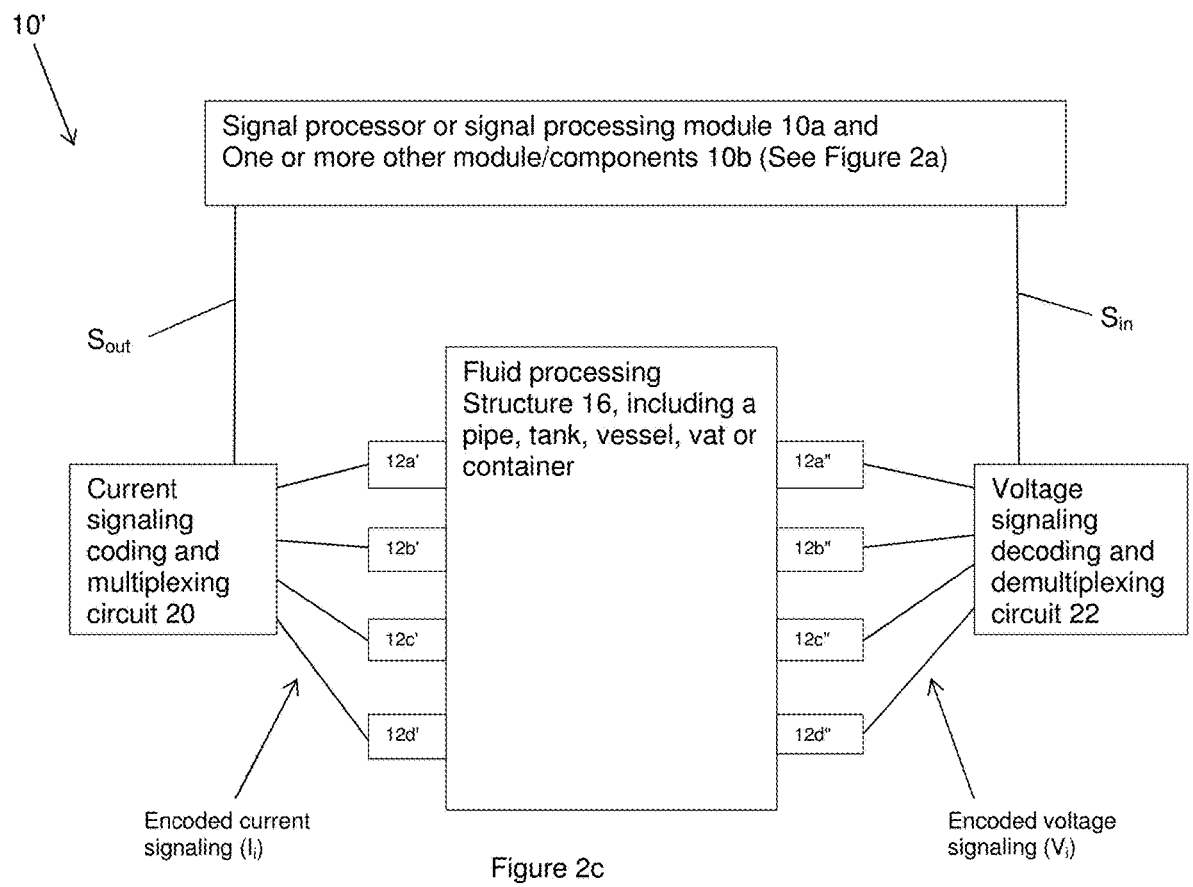
FIG. 2c shows a block diagram of apparatus, including a signal processor or processing module like that shown in FIG. 2a, a current signaling coding and multiplexing circuit, a voltage signaling decoding and demultiplexing circuit and the fluid processing structure, according to some embodiments of the present invention.

FIG. 2b: The Tomographic Indication of the Process Fluid

By way of example, FIG. 2b shows a tomographic indication containing information about the process fluid F, according to some embodiments of the present invention, in the form of a display of the tomographic image or visualization 18 on a monitor or printout 30, e.g., including an image or visualization of, or related to, the multiphase flows, or the liquid interfaces or the liquid-froth layers. By way of example, in FIG. 2b the tomographic image or visualization 18 on the monitor or printout 30 shows that the process fluid F has a first layer $L_1$ and a second layer $L_2$, separated by a layer interface $L_i$. In addition to the image or visualization 18 being in the form of the display of the tomographic image or visualization 18 on the monitor or the printout 30, the scope of the invention is also intended to include other types or kinds of tomographic indications either now known or later developed in the future, including an indication in the form of providing control signaling in order to modify the processing of the multiphase flows, or the liquid interfaces or the liquid-froth layers, consistent with that disclosed herein.

FIG. 2c: Example of an Embodiment

FIG. 2c shows an embodiment of the present invention in the form of apparatus generally indicated as 10' featuring, e.g., the signal processor or processing module 10a (FIG. 2a) configured in relation to, or in combination with, a current signaling coding and multiplexing circuit 20, a voltage signaling decoding and demultiplexing circuit 22 and the fluid processing structure 12.

Consistent with that set forth herein, the current signaling coding and multiplexing circuit 20 may be configured to provide the encoded current signaling ($I_i$), which may include, or correspond to, encoded current signaling $I_1$, $I_2$, $I_3$, as shown in FIG. 3b. By way of example, the encoded current signaling ($I_i$) may include each encoded current signal being over-modulated by a Pseudo-Random Noise Code, including an M-sequence or a Gold-code.

In particular, and by way of example, the current signaling coding and multiplexing circuit 20 may be configured to code and multiplex the encoded current signaling ($I_i$) by:

applying a current signal I₁ (FIG. 3b) driven and formed by an M-Sequence noise code to one pair of electrodes, e.g., electrodes 12a' and 12a" in FIG. 2c; and injecting simultaneously current signals I₂ to Iₙ (FIG. 3b) between n−1 other pairs of electrodes, e.g., electrodes 12b', 12b", 12c', 12c", 12d', 12d" in FIG. 2c, and modulating each current signal I₂ to Iₙ by the same M-sequence code as the current signal I₁, each current signal I₂ to Iₙ being successively delayed by one clock period, T, of an M-sequence noise code bit rate.

The current signaling coding and multiplexing circuit 20 may also be configured to provide the encoded current signaling (I_i) in FIG. 2c, e.g., in response to some control signaling that may include, or form part of, the corresponding signaling S_out provided from the signal processor or processing module 10a, as shown.

Also consistent with that set forth herein, the voltage signaling decoding and demultiplexing circuit 22 may be configured to measure a composite voltage across each electrode pair 12a', 12a", 12b', 12b", 12c', 12c", 12d', 12d" in the array of electrodes configured around the fluid processing structure 16 as shown, and receive the encoded voltage signaling (V_i) associated with the same, as generally indicated in FIG. 2c, which may include, or correspond to, encoded voltage signaling indicated by reference labels voltage I_i, voltage I_{i+1} in FIG. 3b. The voltage signaling decoding and demultiplexing circuit 22 may be configured, e.g., to provide the corresponding voltage signaling as a part of, or in the form of, the signaling S_in that contains information about the coded and multiplexed voltages received by the signal processor or processing module 10a, as shown. In particular, and by way of example, in operation the voltage signaling decoding and demultiplexing circuit 22 may be configured to use a synchronous detection of codes at electrode receiver pairs to separate or decode the voltage signaling (V_i) associated with different drive current signaling applied, e.g., corresponding to encoded current signaling (I_i).

By way of further example, the voltage signaling decoding and demultiplexing circuit 22 may include a differencing circuit 22a and a bank of demultiplexing circuits 22b having mixer circuits 22b' and low pass filter circuits 22b", consistent with that described below in detail in relation to FIG. 4. In operation, the differencing circuit 22a may be configured to subtract a drive voltage signal applied to a j-th electrode pair from a composite voltage signal across the j-th electrode pair, and provide a resulting waveform signal. The mixer circuits 22b" may be configured to mix the resulting waveform signal with a reference bipolar version (1, −1) of noise codes at each code delay used to drive injection current signals I₁-Iₙ, and provide mixed resulting waveform signals. The low pass filter circuits may be configured to filter the mixed resulting waveform signals and provide a final set of low pass filter output signals for each electrode pair, so that N−1 output signals are produced, and each output signal can be read simultaneously by a data acquisition system.

The array of electrodes may include, or may form part of, either a peripheral array of electrodes configured around the pipe, tank, vessel, vat or container, as shown in FIGS. 2c and 3b, or a linear probe tomographic system having linear probes configured inside the fluid processing structure 16', e.g., including electrode pairs 13a', 13a"; 13b', 13b"; 13c', 13c"; 13d', 13d", as shown in FIG. 3c.

FIGS. 3-4

As an illustrative example, FIG. 3 shows the principle operation of a Code Multiplexed EIT Concept (CMEIT) tomographic approach, based at least partly on the use of an M-sequence Pseudo-Random Noise code: It should be noted that those skilled in the field will appreciated that other forms of noise codes could also be employed within the spirit of the present invention.

In this example, a current waveform signal (I₁) driven by an M-Sequence noise code is applied to a pair of electrodes, e.g., around pipe as shown in FIG. 3b. Simultaneously, current signals I₂ to Iₙ may be injected between the n−1 other possible pairs of electrodes. Each current signal I₂ to Iₙ is also modulated by the same M-sequence code as the current signal I₁, but each successively delayed by one 'clock' period, T, of the M-sequence noise code bit rate. e.g., for a bit frequency f, period T=1/f, the I_j-th current is driven by a code delayed by j bits, i.e., a delay τ=jT relative to I₁.

To understand the operation of this approach, one may look at the properties of M-Sequence codes: As mentioned above, the injection current at a given electrode pair may be given by $$I_j = I_o * f(\tau, t), \quad (1)$$

where, I_o is an AC current of the form I sin (ωt), with ω as an AC modulation frequency (angular) of a drive current waveform (~), and f(τ, t) is a generalized form of an M-Sequence code (e.g., in the form of an encoding unipolar waveform signal), all consistent with that shown in FIG. 4.

In this type of arrangement or configuration, the detected electrical potential (V, voltage) at a given pair of electrodes around the pipe (FIG. 3b)—e.g., the j-th pair, V_j, may be a composite potential due to the sum of a series of superimposed potential noise code waveforms of different delays. As this composite potential waveform also contains the driving potential for the injected current at the j-th pair, then this component may have to be strongly suppressed to allow the other signals to be measured. Code division encoding allows this to be completed, but it can be further improved by a direct electronic subtraction approach: In this case, the complex waveform present at electrode pair T may be passed to a unitary amplification buffer and then to a differencing circuit, where the drive voltage applied to the j-th electrodes may be subtracted from the composite signal (see FIG. 4). It will be noted subsequently that while it is advantageous to reduce this direct injection potential from the composite detected potential (V_j), it is not essential to provide a high degree of rejection of this signal. The resulting waveform V'_j may be fed to a bank of demultiplexing circuits, where the waveform is mixed with a reference bipolar version (1, −1) of the noise codes at each code delay used to drive the injection currents I₁-Iₙ. The output of each of the mixers may be fed through a low-pass filter to produce a final set of outputs, for each electrode pair; N−1 outputs are created, each of which can be read simultaneously by a data acquisition system.

This mode of operation of the m-sequence encoding provides very strong isolation between the 'channels' in the multiplexed system (as detailed in the Code Division Multiplexing section below). In the implementation of the multiplexed tomographic analysis system shown in FIG. 3, the electrical signals coupled to the electrode array may be switched on and off according to the m-sequence code, which represents a unipolar code, f(t)=1, 1, 0, ... sequence. If the detected optical signal, e.g., is gated or multiplied by a bipolar sequence; f'(t+τ)=+1, +1, −1, ... , then the correlation function of interest may be the modified autocorrelation:

$$\Psi(\tau) = \int_{-\infty}^{\infty} f(t) * f'(t+\tau) dt, \quad (2)$$

where: f(t) is the bipolar code, and f'(t+τ) is a delayed version of f, t represents time, and τ a represents a delay between the two functions, that is an integer multiple of the bit period T.

For M-sequences, this correlation function has peaks at τ=0, and at time delays:

$$\tau=\pm k^*(2^m-1)^*T, \text{ i.e. at } \tau=0(\text{Mod } N), \quad (3)$$

where, k is an integer ≠0. The correlation function has a peak height of $(2^{m-1})$ and width T on a zero baseline. Consequently, the correlation function is zero for any asynchronous alignment of the codes, giving very suppression of the unwanted signals: As a result, using this modified M-sequence encoding, very selective detection and monitoring of multiplexed signals can be achieved.

ALTERNATIVE EMBODIMENTS

Embodiments are also envisioned in which this multiplexing approach could be utilized for both in-pipe or tank (vat) process visualization, e.g., using an external peripheral array of electrodes (FIGS. 2c and 3b), as well as an internal linear probe tomographic system (FIG. 3c).

It would be understood to those skilled in the art that this approach could also be implemented using other types or kinds of electrical tomography, e.g., including Electrical Capacitance Tomography (ECT).

Signal Processor or Signal Processing Module 10a

By way of example, and consistent with that described herein, the functionality of the signal processor or processing module 10a may be implemented to receive the signaling, process the signaling, and/or provide the corresponding signaling, using hardware, software, firmware, or a combination thereof, although the scope of the invention is not intended to be limited to any particular embodiment thereof. In a typical software implementation, the signal processor or processing module 10a may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor, device or module 10a as either part of the aforementioned apparatus, as a stand alone module, or in the combination with other circuitry for implementing another module.

Techniques for receiving signaling in such a signal processor or processing module 10a are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a without undue experimentation so as to receive signaling containing information about the coded and multiplexed voltages measured across pairs of electrodes in an array of electrodes configured in relation to a fluid processing structure, including a pipe, tank, vessel or container, having a process fluid therein, consistent with that set forth herein.

Techniques, including techniques based on tomography or tomographic processing techniques, for determining information based on analyzing or processing signaling received in such a signal processor or processing module 10a are also known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a without undue experimentation so as to determine using a tomographic signal processing algorithm a tomographic indication of the process fluid, based at least partly on the signaling received, consistent with that set forth herein.

It is also understood that the apparatus 10 may include one or more other modules, components, processing circuits, or circuitry 10b for implementing other functionality associated with the underlying apparatus that does not form part of the underlying invention, and thus is not described in detail herein. By way of example, the one or more other modules, components, processing circuits, or circuitry may include random access memory, read only memory, input/output circuitry and data and address buses for use in relation to implementing the signal processing functionality of the signal processor, or devices or components, etc.

Tomography or Tomographic Processing Techniques in General

Tomography or tomographic processing techniques are known in the art, and generally understood to refer to imaging by sections or sectioning, through the use of any kind of penetrating wave. A device used in tomography is called a tomograph, while the image produced is a tomogram. Such methods or techniques may be used, e.g., in radiology, archeology, biology, geophysics, oceanography, materials science, astrophysics, quantum information and other sciences. In most cases, such methods or techniques may be based on the mathematical procedure called tomographic reconstruction. Tomographic reconstruction algorithms are known in the art for determining the imaging by sections or sectioning, through the use of any kind of penetrating wave. By way of example, the reader is referred to U.S. Pat. Nos. 6,078,397; 5,181,778; 4,386,854; and 4,328,707, which all relate to tomographic techniques and are all incorporated by reference in their entirety. The scope of the invention is not intended to be limited to the type or kind of tomographic reconstruction algorithms, including those based at least partly on using ultrasonic waves, either now known or later developed in the future.

See also the following patent applications disclosing other tomographic technology developed by, and assigned to, the assignee of the present invention, as follows:

PCT/US13/66368, filed 23 Oct. 2013 (WFVA/CiDRA file nos. 712-2.394-1/CCS-0105), which claims benefit to provisional patent application Ser. No. 61/717,332, filed 23 Oct. 2013 (WFVA/CiDRA file nos. 712-2.394/CCS-0105);

PCT/US13/54674, filed 13 Aug. 2013 (WFVA/CiDRA file nos. 712-2.393-1/CCS-0103), which claims benefit to provisional patent application Ser. No. 61/682,979, filed 14 Aug. 2013 (WFVA/CiDRA file nos. 712-2.393/CCS-0103);

PCT/US13/46738, filed 20 Jun. 2013 (WFVA/CiDRA file nos. 712-2.392-1/CCS-0098), which claims benefit to provisional patent application Ser. No. 61/662,094, filed 20 Jun. 2012 (WFVA/CiDRA file nos. 712-2.392/CCS-0098);

PCT/US12/28285, filed 28 Feb. 2013 (WFVA/CiDRA file nos. 712-2.376-1/CCS-0080), which claims benefit to provisional patent application Ser. No. 61/604,080, filed 28 Feb. 2012 (WFVA/CiDRA file nos. 712-2.376/CCS-0080);

PCT application no. PCT/US12/60811 (712-2.363-1 (CCS-0068/70/62WO), filed 18 Oct. 2012, which claims benefit to provisional patent application Ser. No. 61/548,513, filed 18 Oct. 2011 (WFVA/CiDRA file nos. 712-2.363 (CCS-0068/70/62);

PCT application no. PCT/US12/52074 (WFVA/CiDRA file nos. 712-2.358-1/CCS-0069WO), filed 23 Aug. 2012, which claims benefit to provisional patent application Ser. No. 61/526,336, filed 23 Aug. 2011 (WFVA/CiDRA file nos. 712-2.358/CCS-0069), which are all incorporated by reference in their entirety, and all disclose applications based at least partly on using a tomography or tomographic signal processing technique, which were developed and owned by the assignee of the instant patent application, and which is hereby incorporated by reference in its entirety.

Moreover, embodiments are envisioned, and the scope of the invention is intended to include, using other types or kinds of tomography or tomographic signal processing technique either now known or later developed in the future.

Finally, the scope of the invention is not intended to be limited to any particular type or kind of tomography or tomographic processing technique either now known or later developed in the future.

General Discussion of Code Division Multiplexing

Code division multiplexed encoding techniques are known in the art. For example, code division multiplexed encoding is widely used in applications where many signals are presented to a given receiver, such as cellular communications. In this case, the signal is 'spectrally spread' over a wide bandwidth by over-encoding the signal with a noise-like code. In such "spread-spectrum communications" systems, synchronous detection, or de-spreading process, decodes the information channel of interest while spreading any interfering signals occupying the same frequency spectrum. The amplitude suppression ratio, R, of an interfering signal relative to a coded information signal is given by the following equation:

$$R = -20 \log_{10}(2^m - 1) dB \tag{A1}$$

In spread spectrum communications systems, this property is used to discriminate between the wanted coded signal and any differently encoded, or un-encoded 'interfering' signals.

In this disclosure we utilize a unique feature of a particular type of pseudo-noise-like code: M-sequences. M-sequence codes are well known, and can be easily produced using linear shift registers. The auto-correlation functions of m-sequence codes is a measure of it's ability to 'suppress' unwanted signals, is given by:

$$\Psi(\tau) = \int_{-\infty}^{\infty} f(t)^* f(t+\tau) dt \tag{A2}$$

where: f(t) is the bipolar code, and f(t+τ) is a delayed version of f, t represents time, and τ a represents a delay between the two functions, that is an integer multiple of the bit period T.

This auto-correlation function is characterized by peaks at $$\tau = 0, \text{ and } \pm kT[2^m - 1], \text{ i.e. at } \tau = 0 (\text{Mod } N = 2^m - 1)$$

where, k is an integer. The auto-correction function is characterized by a central peak of height=$(2^m-1)$ and width T on a baseline of −1.

A unique feature of M-sequences codes as applied to multiplexed sensing is realized if one of either the spreading function or dispreading functions are bipolar (+1, −1), while the other is unipolar (1, 0):
In this case the correlation function can be expressed as:

$$\Psi(\tau) = \int_{-\infty}^{\infty} f(t)^* f'(t+\tau) dt \tag{A3}$$

Where, f(t) is a unipolar version of the m-sequence function, and f'(t+τ) is a delayed bipolar version of the same m-sequence function, t represents time, and τ a represents a delay between the two functions that is an integer multiple of the bit period T.

This correlation function (A3) has peaks at $$\tau = 0, \text{ and at time delays } \tau = \pm k^*(2^m - 1)^* T, \text{ i.e. at } \tau = 0 (\text{Mod } N = 2^m - 1)$$

where k is an integer ≠0. The correlation function has a peak height of $(2^{m-1})$ and width T on a zero baseline. Consequently, the correlation function is zero for any asynchronous alignment of the codes. This occurs because any unipolar m-sequence code contains $2^{m-1}$ 'ones' and $(2^{m-1}-1)$ 'zeros' and the bipolar code has corresponding $2^{m-1}$ 'ones' and $(2^{m-1}-1)$ 'minus ones': Due to the nature of m-sequences, for any non-synchronous alignment of the codes (f & f'), half the 'ones' in f(t) will always align with '+1' states in f'(t), and the other half of the ones in f(t) always align with '−1' states in f'(t).

This zero correlation value always holds for any asynchronous alignment of the unipolar f(t) code with the bipolar f'(t) code, and thus ensures that delayed coded signals can be rejected with high isolation. In a multiplexed sensor format, this zero-auto-correlation property can be used to provide excellent isolation between the sensed signals, providing that the code length is equal to or greater than the number of sensing points in the system; i.e. $(2^m-1)\sim N$. (e.g., for m=8, N=255). This is a very important aspect of this approach, as high isolation between the electrodes in an electrical tomography system is required to provide accurate visualization of the flow or mixture.

Applications

By way of example, the present invention may be used in, or form part of, or used in conjunction with, industrial processes like a mineral extraction processing system for extracting or separating minerals in a fluidic medium that are either now known or later developed in the future, including any mineral process, such as those related to processing substances or compounds that result from inorganic processes of nature and/or that are mined from the ground, as well as including either other extraction processing systems or other industrial processes, where the extraction, or separating, or sorting, or classification, of product by size, or density, or some electrical characteristic, is critical to overall industrial process performance.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A coded and multiplexed tomographic system for determining information about a process fluid in an industrial fluid processing structure, including a pipe, tank, vessel, vat or container, comprising:
a current signaling coding and multiplexing circuit configured to respond control signaling and inject coded and multiplexed current signaling across pairs of electrodes in an array of electrodes configured in relation to the industrial fluid processing structure having a process fluid therein, the coded and multiplexed current signaling being coded and multiplexed as encoded current signaling by:
applying a current signal $I_1$ driven and formed by an M-Sequence noise code to one pair of electrodes, and
injecting simultaneously current signals $I_2$ to $I_n$ between n−1 other pairs of electrodes, and modulating each current signal $I_2$ to $I_n$ by the same M-sequence code as the current signal $I_1$, each current signal $I_2$ to $I_n$ being successively delayed by one clock period, T, of an M-sequence noise code bit rate;
a voltage signaling decoding and demultiplexing circuit configured to receive coded and multiplexed voltage signaling measured across successive pairs of electrodes in the array of electrodes, and to provide decoded and demultiplexed voltage signaling containing information about the coded and multiplexed voltage signaling measured, the coded and multiplexed voltage signaling being synchronously detected in response to a simultaneous injection of the coded and multiplexed current signaling provided to the pairs of electrodes; and
a signal processor or signal processing module configured to:
receive the decoded and demultiplexed voltage signaling;
provide the control signaling; and
determine tomographic signaling containing information about a tomographic indication having an image or visualization of multiphase flows, liquid interfaces or liquid-froth layers detected in the process fluid using a tomographic signal processing algorithm, based upon the decoded and demultiplexed voltage signaling received.

2. The coded and multiplexed tomographic system according to claim 1, wherein the signal processor or signal processing module is configured to provide the tomographic signaling containing information about the tomographic indication determined, including as control signaling.

3. The coded and multiplexed tomographic system according to claim 1, wherein the image or visualization includes an analysis of mixing in the multiphase flows, liquid interfaces or liquid-froth layers detected in the process fluid.

4. The coded and multiplexed tomographic system according to claim 1, wherein the signaling includes information about a respective measured composite voltage across each successive electrode pair.

5. The coded and multiplexed tomographic system according to claim 1, wherein the simultaneous injection of the coded and multiplexed current signaling is based at least partly on using a code division multiplexing scheme.

6. The coded and multiplexed tomographic system according to claim 1, wherein the coded and multiplexed current signaling includes each coded and multiplexed current signal being over-modulated by a Pseudo-Random Noise Code, including an M-sequence or a Gold-code.

7. The coded and multiplexed tomographic system according to claim 1, wherein the coded and multiplexed tomographic system comprises the array of electrodes.

8. The coded and, multiplexed tomographic system according to claim 1, wherein the voltage signaling decoding and demultiplexing circuit is configured to use a synchronous detection of codes at electrode receiver pairs to separate or decode the voltage signaling associated with different drive current signaling applied.

9. The coded and multiplexed tomographic system according to claim 1, wherein
the voltage signaling decoding and demultiplexing circuit comprises a differencing circuit and a bank of demultiplexing circuits having mixer circuits and low pass filter circuits;
the differencing circuit is configured to subtract a drive voltage signal applied to a j-th electrode pair from a composite voltage signal across the j-th electrode pair, and provide a resulting waveform signal;
the mixer circuits are configured to mix the resulting waveform signal with a reference bipolar version (1, −1) of noise codes at each code delay used to drive injection current signals $I_1$-$I_n$, and provide mixed resulting waveform signals; and
the low pass filter circuits are configured to filter the mixed resulting waveform signals and provide a final set of low pass filter output signals for each electrode pair, so that N−1 output signals are produced, and each output signal can be read simultaneously by a data acquisition system.

10. The coded and multiplexed tomographic system according to claim 1, wherein the array of electrodes includes, or forms part of, either a peripheral array of electrodes configured around the pipe, tank, vessel or container, or a linear probe tomographic system having linear probes configured in the industrial fluid processing structure.

11. The coded and multiplexed tomographic system according to claim 1, wherein the pairs of electrodes in the array of electrodes are based at least partly on using electrical resistance, capacitive or impedance configurations.

12. The coded and multiplexed tomographic system according to claim 1, wherein the tomographic signal processing algorithm is based at least partly on an electrical-based tomographic signal processing algorithm, including electrical resistance tomography (ERT), electrical capacitive tomography (ECT), or electrical impedance tomography (EIT).

13. The coded and multiplexed tomographic system according to claim 1, wherein the signal processor or signal processing module is configured with at least one processor and at least one memory including computer program code, the at least one memory and computer program code configured, with the at least one processor, to cause the apparatus at least to receive the signaling and determine using the tomographic signal processing algorithm the tomographic indication of the process fluid, based at least partly on the signaling received.

14. A method for determining information about a process fluid in an industrial fluid processing structure, including a pipe, tank, vessel, vat or container, with a coded and multiplexed tomographic system, comprising:

responding to control signaling and injecting, with a current signaling coding and multiplexing circuit, coded and multiplexed current signaling across pairs of electrodes in an array of electrodes configured in relation to the industrial fluid processing structure having a process fluid therein, the coded and multiplexed current signaling being coded and multiplexed as encoded current signaling by:

applying a current signal $I_1$ driven and formed by an M-Sequence noise code to one pair of electrodes, and injecting simultaneously current signals $I_2$ to $I_n$ between n−1 other pairs of electrodes, and modulating each current signal $I_2$ to $I_n$ by the same M-sequence code as the current signal $I_1$, each current signal $I_2$ to $I_n$ being successively delayed by one clock period, T, of an M-sequence noise code bit rate;

receiving, with a voltage signaling decoding and demultiplexing circuit, coded and multiplexed voltage signaling measured across successive pairs of electrodes in the array of electrodes, and providing decoded and demultiplexed voltage signaling containing information about the coded and multiplexed voltage signaling measured, the coded and multiplexed voltage signaling being synchronously detected in response to a simultaneous injection of the coded and multiplexed current signaling provided to the pairs of electrodes; and receiving, with a signal processor or signal processing module, the decoded and demultiplexed voltage signaling, providing the control signaling, and determining tomographic signaling containing information about a tomographic indication having an image or visualization of multiphase flows, liquid interfaces or liquid-froth layers detected in the process fluid using a tomographic signal processing algorithm, based upon the decoded and demultiplexed voltage signaling received.

15. The method according to claim 14, wherein the method comprises basing the simultaneous injection of the coded and multiplexed current signaling at least partly on using a code division multiplexing scheme.

16. The method according to claim 14, wherein the method comprises configuring the coded and multiplexed current signaling so that each coded and multiplexed current signal is over-modulated by a Pseudo-Random Noise Code, including an M-sequence or a Gold-code.

17. The method according to claim 14, wherein the method comprises providing, with the signal processor or signal processing module, the corresponding signaling containing information about the tomographic indication determined, including providing control signaling.

18. The method according to claim 14, wherein the image or visualization includes an analysis of mixing in the multiphase flows, liquid interfaces or liquid-froth layers detected in the process fluid.

19. The method according to claim 14, wherein the signaling includes information about a respective measured composite voltage across each successive electrode pair.

\* \* \* \* \*